No. 798,458. PATENTED AUG. 29, 1905.
E. SCHULTZ.
SPEED AND DISTANCE INDICATOR.
APPLICATION FILED FEB. 9, 1903.

4 SHEETS—SHEET 1.

Fig. 1.

WITNESSES:
W. M. Avery
A. H. Davis

INVENTOR
Emil Schultz
BY
[signature]
ATTORNEYS

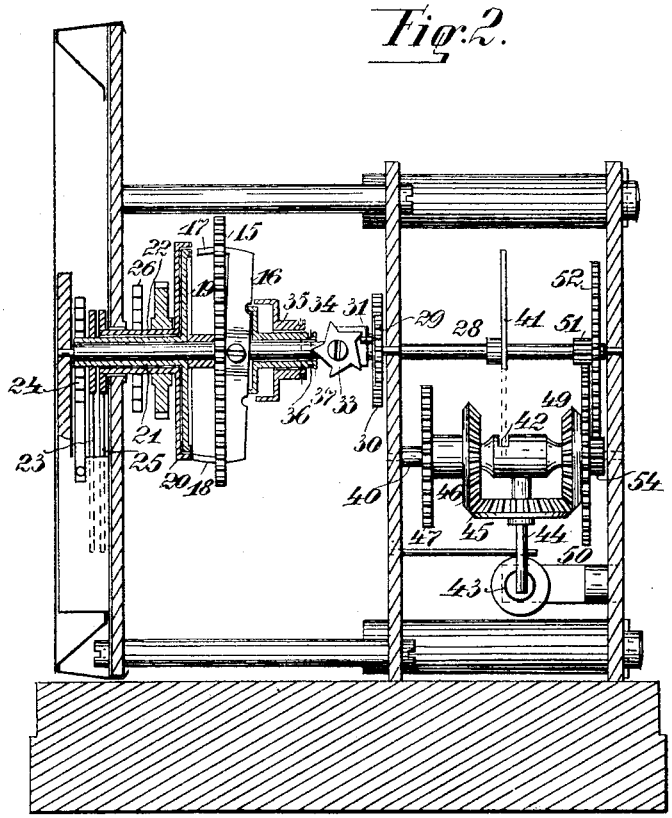

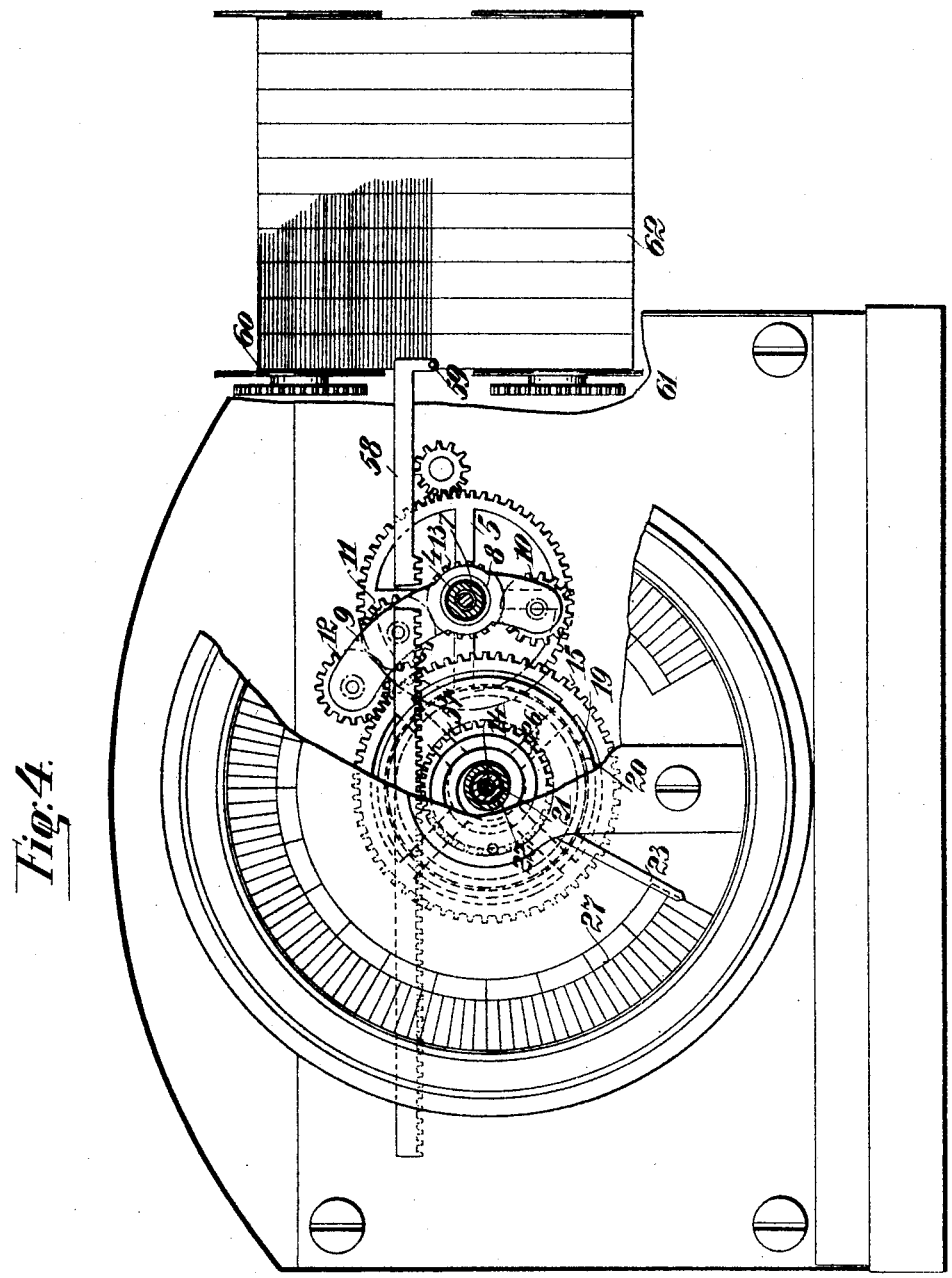

No. 798,458.

PATENTED AUG. 29, 1905.

E. SCHULTZ.
SPEED AND DISTANCE INDICATOR.
APPLICATION FILED FEB. 9, 1903.

4 SHEETS—SHEET 4.

WITNESSES:
W. M. Avery
A. E. Davis

INVENTOR
Emil Schultz
BY
ATTORNEYS

UNITED STATES PATENT OFFICE.

EMIL SCHULTZ, OF BERLIN, GERMANY.

SPEED AND DISTANCE INDICATOR.

No. 798,458.  Specification of Letters Patent.  Patented Aug. 29, 1905.

Application filed February 9, 1903. Serial No. 142,512.

*To all whom it may concern:*

Be it known that I, EMIL SCHULTZ, a subject of the German Emperor, and a resident of Berlin, Germany, have invented new and useful Improvements in Speed and Distance Indicators or the Like, of which the following is a full, clear, and exact description.

The present invention relates to improvements in speed and distance indicators or the like.

This invention consists in alternately and at equal intervals of time coupling and uncoupling a pointer to and from a rotating shaft, the speed of the said shaft being proportional to the speed of traveling to be measured and the said pointer being adapted to return automatically to its zero position under spring-pressure or by gravity or the like. More than one pointer can also be used, in which case the pointers are preferably so operated that one pointer is coupled to the shaft at the moment at which another pointer is uncoupled from the latter. Instead of the pointer or pointers a rack carrying a pencil or the like can be used, the said rack being alternately engaged by gearing operated from the driving-shaft and disengaged and returned to a zero position. The pencil is adapted to make parallel marks on a strip of paper or tape, which may be caused to move intermittently and uniformly when the rack is engaged or disengaged. The pencil-marks serve as a measure of the speed attained at the respective periods and may collectively serve as a measure of the distance traversed. The apparatus can therefore be used as a speed-meter or distance-meter on railway-vehicles or any other kind of vehicle and also as a tachometer, or in all cases in which the object is to convert a rotatory movement into rectilinear or circular movements rising from zero and falling to zero again.

Reference is to be had to the accompanying drawings, forming a part of this specification, in which similar characters of reference indicate corresponding parts in all the figures.

Figure 6:
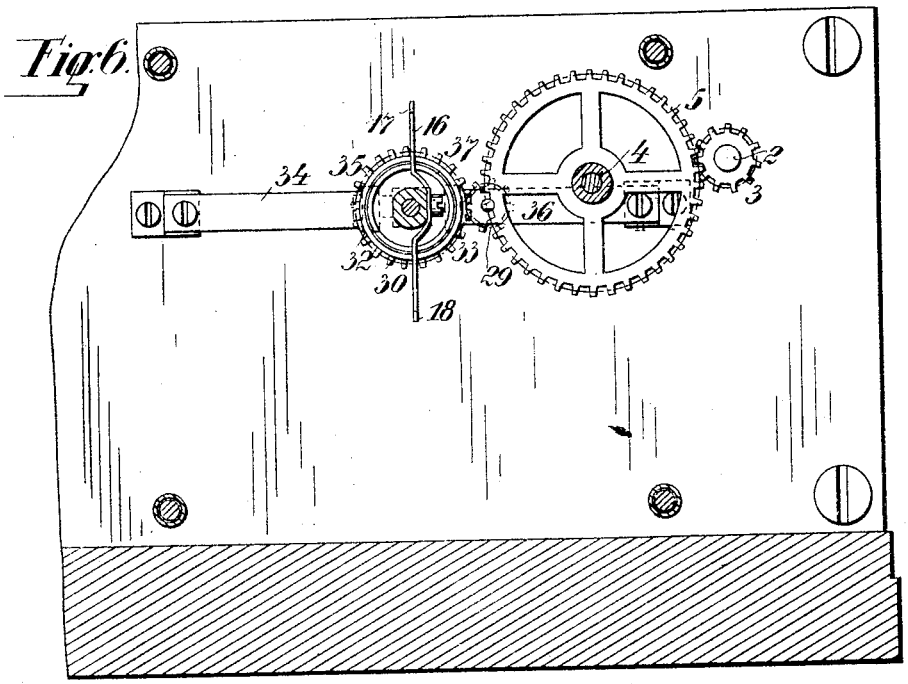
Figure 7:
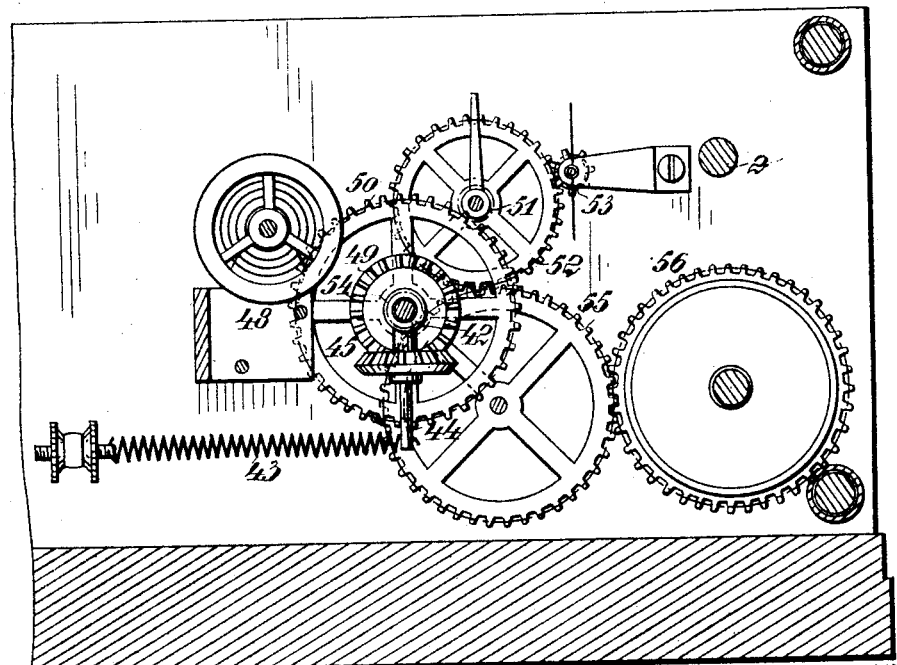

Figure 1 is a horizontal sectional view taken through a vehicle having my improvements applied thereto. Fig. 2 is a vertical section showing the arrangement of the pointer-operating mechanism. Fig. 3 is a detail view showing the arrangement of a portion of the gearing used in connection with the pointer-operating mechanism. Fig. 4 is a view, partly broken away, showing the indicator-dial and the pointer-operating mechanism; and Figs. 5, 6, and 7 are detail views showing the various parts of the indicator-operating mechanism.

The annexed drawings illustrate the invention in the form of a speed-meter for railway-vehicles. The sprocket-wheel 1, keyed to the shaft 2, is driven by one of the axles or wheels of the vehicle in such a manner, say, that the said wheel 1 makes one complete revolution when the vehicle has traversed a distance of four meters. The rotation of the shaft 2 is transmitted to the pinion 3, which is in mesh with the gear-wheel 5, fixed to the shaft 4. On the latter is also mounted a sleeve 7, limited by a collar 6. On the said sleeve is a powerful helical spring 8, which bears against the double-armed lever 9, fulcrumed on the shaft 4. In one arm of this lever 9 is mounted the gear-wheel 10, Fig. 3, and in the other arm are mounted the two gear-wheels 11 and 12. These gear-wheels have equal numbers of teeth, and the wheel 10 is connected to the wheels 11 and 12 by a gear-wheel 13, keyed on the shaft 4. The wheel 13 has the same number of teeth as the wheels 10, 11, and 12, respectively. When the shaft 2 rotates, the shaft 4 is rotated in the opposite direction, but at the same time the lever 9 is slightly rotated by means of the spring 8, and according to the direction of this rotation either the wheel 10 or the wheel 12 is brought into gear with a toothed wheel 15, mounted on a fixed shaft 14. It is obvious from the arrangement of the wheels 10, 11, 12, and 13 that the wheel 15 will always be rotated in the same direction whichever direction the shaft 2 is rotated in or, in other words, in whichever direction the vehicle travels.

On the hub of the wheel 15 is pivoted a rocker 16, provided with two projections 17 and 18, Figs. 1 and 3. The projections 17 and 18 are adapted to engage toothed wheels 19 and 20, respectively, so that the latter, which are mounted on the shaft 14 and provided with cylindrical hubs 21 and 22, respectively, can be coupled to the wheel 15 and the shaft 2. The rocking arms 16 can, however, only be in engagement with one of the said wheels 19 or 20 at a time, so that only one of the latter will be rotated.

On the hub 21 of the wheel 19 are fixed the pointer 23 and the spring 24. The latter tends to hold the pointer in its zero position. In a similar manner the spring 26 tends to hold the pointer 25 on the hub 22 in its zero position. The object is to cause the pointers to move alternately out of the zero position while the shaft 2 is revolving. The movement of each pointer always continues for the same length of time—say two seconds—at the end of which the pointer returns to the zero position, and the other pointer moves out of the latter during two seconds. This alternate movement is continuous, and the extreme positions can be read off a scale 27. The divisions on the said scale and the ratio of transmission from the sprocket-wheel 1 to the toothed wheel 15 are so arranged that the velocity per hour of the vehicle—say in kilometers—at the moment of taking the reading are indicated. In order to obtain the alternate movement of the two pointers, means are required for rocking the arm 16, say, every two seconds. For this purpose the shaft 28 and pinion 29 are provided and caused to perform one complete revolution in exactly two seconds. Each revolution of the said shaft and pinion rotates the toothed wheel 30 through one hundred and eighty degrees, so that the pin 31 on the latter alternately rotates the spur-wheels 32 and 33 through the space of one tooth. When the wheel 32 is rotated, it displaces the plate-spring 34 and sleeve 35. By this means the rocking arm 16 is rocked out of the position shown in Fig. 1. When thereupon at the end of two seconds the wheel 33 is rotated, the plate-spring 36 and sleeve 37 are displaced, and by this means the arm 16 is rocked back into the position shown in Fig. 1. The springs 34 and 36 tend to move the sleeves 35 and 37, respectively, away from the rocking arm and to move the said sleeves away as soon as the respective teeth of the spur-wheels have cleared the springs or the abutments 38, fixed to the latter.

In order to revolve the pinion 29 in equal periods—for example, as mentioned, once in every two seconds—the following arrangement can be used: The cylinder 39 is rotatable on the fixed shaft 40, and the arm 41, which a watch-spring tends to rotate, is adapted to bear on the said cylinder. This arm can, however, only rotate when the position of the cylinder allows the arm to enter the groove 42, provided in the former. In order to revolve the cylinder regularly once in the two seconds, an antagonistic spring 43 is attached to a rod 44, fixed to the cylinder 39. Mounted on this rod or shaft 44 is a bevel-wheel 45, gearing with a bevel 46, and connected to the latter is a gear-wheel 47, connected to an escapement 48 of known construction. The bevel 45 also gears with a bevel 49, which is rotatable on shaft 40 and has a pinion 50. The latter is in mesh with a pinion 51 on the shaft 28. On this latter is a toothed wheel 52, connected with the regulator 53. The shaft 40 is provided with another pinion 54, which meshes with the toothed wheel 55 in gear with the spring-case 56. The spring in this case is not fixed in the usual way, but the outer end thereof slides on the inner wall of the spring-drum. The spring can therefore never be overwound. The spring is automatically wound by the shaft 2, a cam on which is adapted to operate a winding mechanism which suitably tensions the spring in whichever direction the shaft is revolving. The action of the escapement 48 on the spring 34 causes the shaft 44 and cylinder 39 to revolve uniformly. This revolution ceases at the end of two seconds, since then the groove 42 is so placed that the arm 41 can make a complete revolution, which latter is produced by the spring in the spring-case 56. At the same time the cylinder 39 is rotated back and the spring 43 tensioned, so that the arm 41 cannot make another revolution until after the expiration of two seconds, when the groove 42 has returned to the required position.

The modification shown in Fig. 4 is substantially similar to the described arrangement, except that on the hub 22 a toothed wheel 57 is fixed in gear with a rack 58, to which is fastened a pencil 59, adapted to produce lines on a paper strip 62, placed over drum 60 61. The latter are uniformly rotated continuously or intermittently by means of a suitable clockwork or by the spring-case 56. The rack is pushed forward by the rotation of the toothed wheel 57 and is moved back again by the spring 25 when the wheel 20 is ungeared.

Having now particularly described and ascertained the nature of my said invention and in what manner the same is to be performed, I declare that what I claim is—

1. A speed or distance indicator or the like, having a pointer adapted to be normally held in zero position, a wheel mounted to turn and connected with the said pointer to actuate the same a shaft revolved at a speed proportional to the speed to be measured, and means for alternately and at equal intervals coupling the said wheel to the shaft to turn the wheel and uncoupling it from the said shaft.

2. A speed-indicator or the like, having a plurality of pointers adapted to be normally held in zero position, wheels mounted to turn and each connected with a pointer to actuate the same a shaft revolved at a speed proportional to the speed to be measured, mechanism for alternately coupling the said wheels to the shaft to turn the wheels and uncoupling the same, the coupling of one wheel being effected when another wheel is uncoupled.

3. A speed-indicator or the like having a plurality of pointers adapted to be normally held in zero position, a shaft 2 revolved at a speed proportional to the speed to be measured, wheels 19 and 20 carrying the said pointers, a rocking bar 16 for engaging the said wheels to couple the same alternately to the said shaft and mechanism including resilient means 36, 37, for moving the rocking bar.

4. In a speed-indicator or the like, a toothed wheel 30 revolving at equal intervals of time through one hundred and eighty degrees and provided with a pin 31, spur-wheels 32, 33, rotated alternately for one tooth's distance by means of the said pin, and sleeves 35, 37, displaced by the movement of the spur-wheels.

5. In a speed-indicator or the like, a main shaft 2 revolved at a speed proportional to the speed to be measured, a pointer actuated therefrom, and an arrangement of change-wheels, consisting of a double-armed lever 9, a shaft 4 and spring 8 for rocking the lever, a toothed wheel 10 carried on one arm of the lever and a pair of toothed wheels 11, 12, carried on the other arm, for the purpose of revolving the pointer always in the same direction independent of the direction of revolution of the main shaft.

6. A speed-indicator or the like having a plurality of pointers normally held in zero position, a shaft revolved at a speed proportional to the speed to be measured, wheels carrying the said pointers, a rocking bar for engaging the said wheels, the rocking bar being mounted to turn and rotated from the said shaft, sleeves mounted to slide and adapted to engage and move the rocking bar, a toothed wheel revolving at equal intervals of time through one hundred and eighty degrees and provided with a pin, means for revolving the toothed wheel, spur-wheels alternately rotated through the space of one tooth by the pin on the toothed wheel, and springs connected with the sleeves and moved by the spur-wheels.

7. In a speed or distance indicator or the like, a main shaft revolved at a speed proportional to the speed to be measured, a pointer driven therefrom, and mechanism for revolving the pointer always in the same direction independent of the direction of revolution of the main shaft, the said mechanism including a shaft driven from the main shaft, a double-armed lever fulcrumed on the shaft, a spring bearing against the lever and serving to rock the same when the shaft is rotated, a toothed wheel carried by one arm of the lever and a pair of toothed wheels carried by the other arm.

8. In a speed or distance indicator, a plurality of indicating devices proper, a wheel connected with each indicating device to actuate the same a shaft revolved at a speed proportional to the speed to be measured, and mechanism including a rotating rocking bar for alternately coupling and uncoupling the said wheels and the said shaft.

9. In a speed or distance indicator or the like, a main shaft revolved at a speed proportional to the speed to be measured, an indicating device proper moved from the said shaft, and mechanism for moving the indicating device always in the same direction irrespective of the direction of revolution of the main shaft, the said mechanism comprising a toothed wheel mounted to turn and connected with the indicating device, a shaft driven from the main shaft, a double-armed lever fulcrumed on the shaft, a gear-wheel carried by one arm of the lever, a pair of gear-wheels carried by the other arm and in mesh with each other, a gear-wheel on the shaft for imparting motion to the gear-wheels on the lever, the gear-wheel at one end of the lever being adapted to mesh with the toothed wheel connected with the indicating device when the lever is rocked in one direction, and the gear-wheel at the other end of the lever meshing with said toothed wheel when the lever is rocked in the other direction, and means for rocking the lever when the shaft is rotated in either direction.

10. The combination with a vehicle, of a shaft adapted to rotate at a speed proportional to the speed of traveling to be measured, an indicator for said shaft, means including a rotating rocking bar for coupling and uncoupling the indicator and the shaft, and mechanism for moving the indicator when coupled always in the same direction irrespective of the direction of revolution of the shaft.

11. The combination with a vehicle, of a shaft carried thereby and adapted to rotate at a speed proportional to the speed of traveling to be measured, an indicator proper normally resting at zero position, mechanism for coupling and uncoupling the indicator of the shaft, the said mechanism including a wheel connected with the indicator to operate the same, a toothed wheel driven from the shaft, a rocking bar turning with the toothed wheel and adapted to engage the wheel connected with the indicator to couple the said wheel to the toothed wheel, and means for rocking the said bar, mechanism for moving the indicator when coupled to the shaft always in the same direction independent of the direction of revolution of the main shaft, and means for automatically returning the indicator to zero position when the said indicator is uncoupled from the shaft.

In witness whereof I have hereunto signed my name, this 24th day of January, 1903, in the presence of two subscribing witnesses.

EMIL SCHULTZ.

Witnesses:
  FRANZ SCHWENTERLEY,
  WOLDEMAR HAUPT.